April 23, 1968 E. R. BARNETT ETAL 3,379,889
BEAM-DRIVEN GYROSCOPE DEVICE
Filed April 5, 1963 2 Sheets-Sheet 1

EUGENE R. BARNETT
WILLARD L. BARNETT
INVENTORS

BY *Robert A. Spray*
ATTORNEY

EUGENE R. BARNETT
WILLARD L. BARNETT
INVENTORS

BY Robert A. Spray
ATTORNEY

United States Patent Office 3,379,889
Patented Apr. 23, 1968

3,379,889
BEAM-DRIVEN GYROSCOPE DEVICE
Eugene R. Barnett and Willard L. Barnett, both of
6268 Windsor Drive, Indianapolis, Ind. 47906
Filed Apr. 5, 1963, Ser. No. 270,942
10 Claims. (Cl. 250—215)

This invention relates to control means, and more particularly to control means utilizing gyroscopic components for control of vehicles.

The general object of the invention is to provide new and improved gyroscopic control means having advantageous features of sensing, operation and responsiveness.

In carrying out the invention in an illustrative embodiment, there is provided a movable ball-like rotor inside a spherical stator, with magnetic means for suspending the rotor in the stator. Energy means, such as photo-electric rays and cells, are provided to energize the magnetic means, to sense location-deviations of the rotor and to maintain the suspended location of the rotor. Other energy means are directed to strike the ball, achieving gyroscopic ball-revolution by radiometer effect on suitably-provided portions of the rotor, and also imparting energy to a rotor-carried energy system such as electricity which illuminates an energy output such as a light bulb whose rays are directed axially of the rotor. A sensing means is provided on the stator to sense deviations of the rotor axis with respect to the stator, by sensing change in relative direction of those light rays.

Other means are contemplated to integrate the knowledge sensed by each of the sensing means, the amount of energy required to maintain rotor-location reflecting the accelerating forces on the vehicle; and the sensed knowledge may be used to control the orientation or attitude of the vehicle to bring the stator back to the selected position relative to the rotor axis.

The description so far given is only general. As will be shown in the following, more detailed description, several features and concepts combine to provide advantages of sensing, operation, and responsiveness. Accordingly, the above-mentioned and other features, objects, concepts and advantages will be further explained and apparent from the following description of an illustrative embodiment of the invention, reference being had to the accompanying somewhat schematic and diagrammatic drawings, in which:

FIG. 3 illustrates primarily the concept of the use of energy beams for sensing location-deviation of the rotor;

FIG. 4 illustrates primarily the concept of the energization of electromagnets to position the rotor in the stator;

FIG. 5 illustrates primarily energy concepts for beams which both impart rotation of the rotor and energize a rotor circuit whose operation is shown in FIG. 6;

FIG. 6 illustrates the rotor circuit shown in FIG. 5 which when energized energizes energy means which project an energy ray toward sensing cells of the stator, for the sensing of rotor movement as illustrated in FIG. 7; and FIG. 7 illustrates the concept of sensing the rotor movement by the sensing cells sensing the energy ray shown in FIG. 6.

Figure 1:
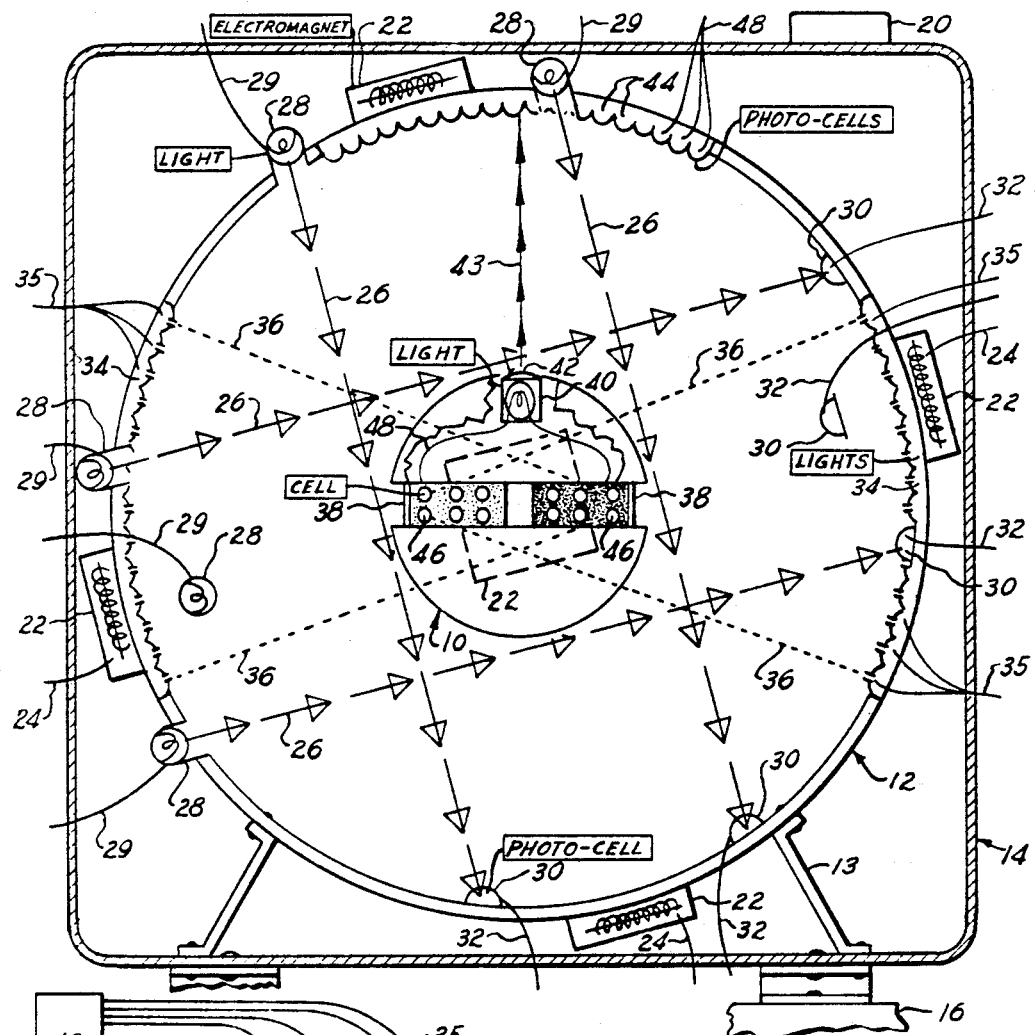
FIG. 1 is a cross-sectional view through the casing and stator.

As shown in the drawings, an illustrative embodiment of the invention generally comprises a control means including a gyroscopic rotor element 10 within a stator 12, the stator 12 being mounted on brackets 13 within a casing 14 which would be mounted on stationary framing 16 of the associated vehicle with which the control means is used, and a control unit 18 mounted outside the casing 14 but electrically connected to the stator 12. Temperature control is schematically illustrated by a control means 20.

As will be now described, the features of the invention include several co-operating control and actuation means. For ease of understanding, the concepts and functional means will be described separately, as distinct features, although they would usually be all operating concurrently and co-operatively. The various concepts and features of the overall invention will thus be described with reference to the following general headings: (A) Means for locating the rotor in the stator, and for sensing and correcting location-deviation of the rotor; (B) Means for imparting rotation to the rotor; and (C) Means for sensing and correcting relative rotation of the rotor and stator.

(A) *Means for locating the rotor in the stator, and for sensing and correcting location-deviation of the rotor*

Figure 2:
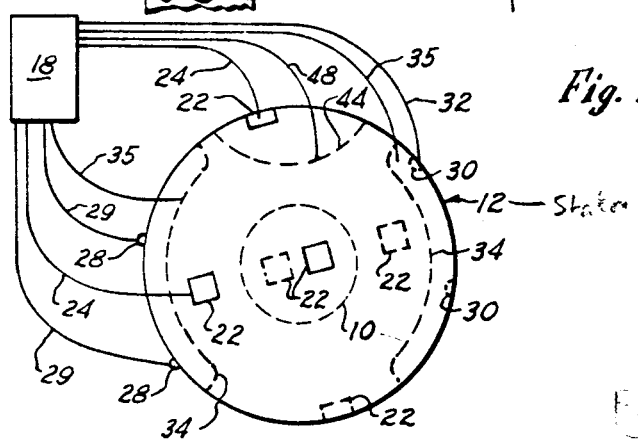
FIG. 2 is a pictorial view, in smaller scale, the casing and certain other features being removed for clarity.
Figure 4:
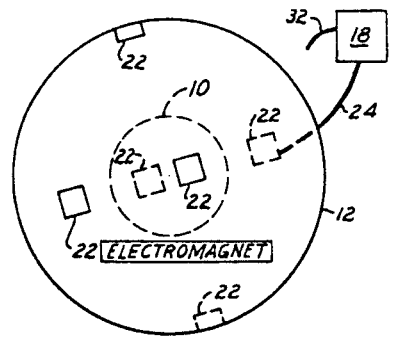

The stator is provided with electromagnetic means 22, (FIGS. 1, 2, and 4) relatively located at ninety-degree intervals over the sphere. Wires 24, leading from control unit 18, are connected to each of the magnetic means 22 to energize the electromagnets to magnetically suspend rotor 10 in the stator 12.

Figure 3:
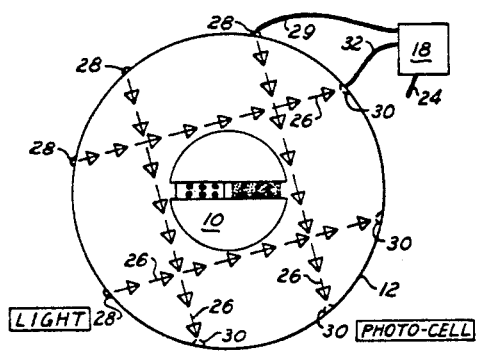
FIGS. 3 through 7 are fragmental pictorial views, illustrating, in a somewhat schematic and isolated manner for clarity of understanding of the concepts, certain of the aspects of the overall invention, as follows.

Energy beams, such as light beams 26 illustrated by the dashed lines with the open arrow-heads, (FIGS. 1 and 3) are projected from sources such as the light sources 28 carried by the stator 12, being actuated through wires 29 from control unit 18. The light sources 28 are provided in quantity to project their beams 26 closely adjacent the outline of rotor 10 when the rotor is in its desired central location in the stator. Sensing means such as the photocells 30 sense the characteristics of beams 26.

Thus, when the rotor 10 has deviated from its central location, the rotor 10 blocks one of the beams 26 and this is sensed by the associated cell 30. This knowledge is then electrically carried by wire 32 to the control unit 18, which actuates associated means (not shown) within the control unit 18 to energize the magnet or magnets 22 which again center the rotor.

The amount of energy required to maintain rotor-centering furnishes an indication of the forces acting on the associated vehicle; for inertia forces, induced as the stator is changed in velocity or direction, cause relative movement of the rotor and stator, and thus the energy to re-center the rotor indicates the extent of such changes.

(B) *Means for imparting rotation to the rotor*

Figure 5:
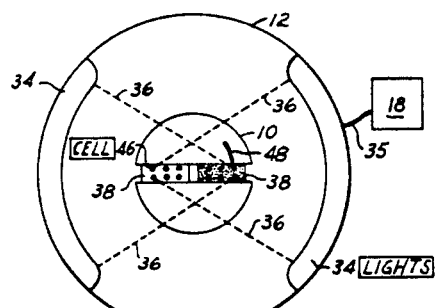

The stator 12 is also provided (FIGS. 1, 2, and 5) with other energy sources, such as a plurality of groups of light sources 34, which project energy beams illustrated by the lines of short dashes 36, inwardly onto the rotor 10. Sources 34 are actuated through wires 35 from control unit 18.

These beams 36 strike radially-extending vanes 38 provided in a central portion of the rotor 10. Opposite sides of each vane 38 are colored light and dark, respectively, with correspondingly facing faces of succeeding vanes being correspondingly colored; accordingly, the stator being substantially evacuated of air or other gas, the radiometer-effect achieved as the beams 36 strike the vanes 38 imparts gyroscopic rotation to the rotor.

(The radiometer effect, as is known, is a phenomenon achieved by the air molecules rebounding with greater energy off the darker surface than off the lighter surface, coupled perhaps with the greater energy absorption by the darker surface of kinetic energy of the beams, thus causing the movable element to move away from the darker sides.)

(C) *Means for sensing and correcting relative rotation of the rotor and stator*

Figure 6:
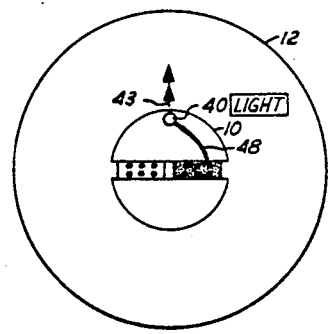
Figure 7:
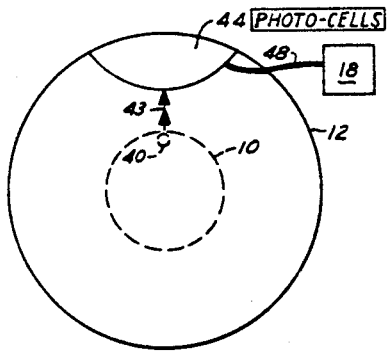

The rotor 10 carries a further energy source, such as a light bulb 40, (FIGS. 1 and 6) axially disposed in rotor 10. This bulb 40 projects axially of the rotor, through a focusing lens 42, a beam 43 illustrated by the ray-line having the closed arrowheads outwardly toward the interior surface of the stator 12. Sensing means such as the group of photocells 44 (FIGS. 1, 2, and 7) sense the impact of beam 43 and thus the relative orientation of the rotor 10 and stator 12. Energy for bulb 40 is shown as by cells 46 carried by the rotor-vanes 38, (FIGS. 1 and 5) which convert some of the energy of beams 36 to electricity which is transmitted via rotor wires 48 connected to bulb 40.

Accordingly, if the relative orientation of rotor 10 and stator 12 is changed, as by a shift in direction of the associated vehicle, the relative movement of beam 43 (FIGS. 1, 6, and 7) along sensing area 44 imparts knowledge through wires 48 from area 44 to the control unit 18, each portion of that area 44 having its own wire 48 to thus indicate the extent of beam-deviation. This knowledge and information, by mechanism (not shown) in the control unit 18, may be projected and used if desired to control the attitude or orientation of the associated vehicle to bring back the selected orientation of the beam 43 and sensing area 44.

The three energy beams indicated by beams 26, 36, and 43 are provided of different types, such as of different frequencies, wave-lengths or other characteristics, so that neither energy source will activate the sensing device of the others.

The stator 12 is provided of air-tight character and partially evacuated for reduction of friction but with sufficient air or other gas for the radiometer effect desired. The casing 14 is likewise desirably air-tight for better control of temperature and other environmental characteristics, the control means indicated schematically at 20 maintaining desired uniformity of conditions in the stator 12 and removing heat as required from the energy sources described.

A gyroscopic control means according to the concepts of the present invention thus provides many advantages of construction, operativity, sensing, and control, achieving advantages pointed out in the description and inherent in the inventive concepts.

It will be understood that modifications and variations may be effected without departing from the scope of the novel concepts of the present invention. Accordingly, the invention is not to be limited to the specific form or arrangement of parts herein described and shown.

What is claimed is:

1. A control means, comprising
a stator means;
a gyroscope member;
magnetic means for locating the gyroscope member in a certain location within the stator means;
first energy means, including means for directing energy beams adjacent said certain location, and for sensing movement of said gyroscope member away from said certain location by sensing characteristics of said energy beams, and for actuating said magnetic means for maintaining the gyroscope member in the said certain location;
second energy means directed toward the gyroscope member;
the gyroscope member being provided with first energy conversion means adapted to convert portions of the energy from second energy means to impart rotation to the gyroscope member;
the gyroscope member being also provided with second energy conversion means adapted to convert portions of the energy from second energy means, and with communicative energy means energized thereby;
third energy means carried by the said gyroscope member, energized by said communicative energy means, and including a directional energy means directed axially of said gyroscope member;
sensing means carried by the stator means to sense the direction of said directional energy means relative to the stator means.

2. A control means, comprising:
a stator means;
a gyroscope member;
magnetic means for locating the gyroscope member in a certain location with respect to the stator means;
first energy means, including means for directing energy beams adjacent said certain location, and for sensing movement of said gyroscope member away from said certain location by sensing characteristics of said energy beams;
second energy means directed toward the gyroscope member;
the gyroscope member being provided with energy conversion means adapted to convert portions of the energy from second energy means to impart rotation to the gyroscope member;
third energy means carried by the said gyroscope member, energized by said communicative energy means, and including a directional energy means directed axially of said gyroscope member;
sensing means carried by the stator means to sense the direction of said directional energy means relative to the stator means.

3. A control means, comprising:
a stator means;
a gyroscope member;
magnetic means for locating the gyroscope member in a certain location with respect to the stator means;
first energy means, including means for sensing movement of said gyroscope member away from said certain location, and for actuating said magnetic means for maintaining the gyroscope member in the said certain location;
second energy means directed toward the gyroscope member;
the gyroscope member being provided with first energy conversion means adapted to convert portions of the energy from second energy means to impart rotation to the gyroscope member;
the gyroscope member being also provided with second energy conversion means adapted to convert portions of the energy from second energy means, and with communicative energy means energized thereby 4. A control means, comprising:
a stator means and a movable means;
magnetic locating means for locating said movable means in a certain location with respect to said stator means;
first energy means, including a photo-electric system, and responsive to movement of said movable means away from said certain location, for energizing said locating means;
the said movable means being gyroscopically rotatable in response to light energy from a second energy means by radiometer effect;
second energy means for imparting rotation to said movable means;
third energy means carried by the movable means, and including means for converting a portion of said light from said second energy means to electric energy; also including an electrically actuated light which projects a light beam axially of the movable means and toward the stator means;
indicating means carried by the stator means, responsive to light energy of said third energy means, to indicate relative movement of the axis of the movable means with respect to the stator means;

first control means which sense the amount of energy, expended by said locating means in maintaining the movable means in said certain location; and second control means, responsive to said indicating means, to control the orientation of said stator means with respect to the axis of said movable means.

5. A control means, comprising:

a stator means and a movable means;

magnetic locating means for locating said movable means in a certain location with respect to said stator means;

first energy means, including a photo-electric system, and responsive to movement of said movable means away from said certain location, for energizing said locating means;

the said movable means being gyroscopically rotatable in response to light energy from a second energy means by radiometer effect;

second energy means for imparting rotation to said movable means;

third energy means carried by the movable means, and including means for converting a portion of said light from said second energy means to electric energy, also including an electrically actuated light which projects a light beam axially of the movable means and toward the stator means;

indicating means carried by the stator means, responsive to light energy of said third energy means, to indicate relative movement of the axis of the movable means with respect to the stator means.

6. A control means, comprising:

a stator means and a movable means;

locating means for locating said movable means in a certain location with respect to said stator means;

first energy means, responsive to movement of said movable means away from said certain location, for energizing said locating means;

the said movable means being rotatable in response to energy from a second energy means;

second energy means for imparting rotation to said movable means;

third energy means carried by the movable means;

the said third energy means being actuated by said second energy means;

indicating means carried by the stator means, responsive to energy of said third energy means, to indicate relative movement of the axis of the movable means with respect to the stator means;

first control means which sense the amount of energy, expended by said locating means in maintaining the movable means in said certain location; and second control means, responsive to said indicating means, to control the orientation of said stator means with respect to the axis of said movable means.

7. A control means, comprising:

a stator means and a movable means;

locating means for locating said movable means in a certain location with respect to said stator means;

first energy means, responsive to movement of said movable means away from said certain location, for energizing said locating means;

the said movable means being rotatable in response to energy from a second energy means;

second energy means for imparting rotation to said movable means;

third energy means carried by the movable means;

the said third energy means being actuated by said second energy means;

indicating means carried by the stator means, responsive to energy of said third energy means, to indicate relative movement of the axis of the movable means with respect to the stator means.

8. A control means, comprising:

a stator means and a gyroscopic rotor means;

energy means carried by the rotor means, said energy means being responsive to radiant energy to both effect movement of the rotor means and to actuate the below-mentioned indicating means;

indicating means carried by the stator means, responsive to energy of said energy means, to indicate relative movement of the axis of the rotor means with respect to the stator means.

9. A control means, comprising:

a stator means;

a gyroscope member;

magnetic means for locating the gyroscope member in a certain rotational orientation within the stator means;

energy means, including means for sensing the extent of rotational movement of said gyroscope member relatively away from said certain orientation, and for relatively moving said stator means and said gyroscope member to re-establish the gyroscope member in the said certain orientation.

10. The invention as set forth in claim 9, in a combination in which the means for sensing the extent of said rotational movement is responsive to energy of drive means which drives the gyroscope member.

References Cited

UNITED STATES PATENTS

| | | | |
|---|---|---|---|
| 1,467,154 | 4/1923 | Hammond | 250—203 |
| 1,999,646 | 4/1935 | Wittkuhns | 250—234 X |
| 2,378,744 | 6/1945 | Annen | 250—234 |
| 2,541,217 | 2/1951 | Dias | 250—234 |
| 2,566,221 | 8/1951 | Lovell | 310—166 |
| 2,919,358 | 12/1959 | Marrison | 250—231 |
| 2,919,583 | 1/1960 | Parker | 74—5 |
| 2,942,479 | 6/1960 | Hollmann | 74—5.6 |
| 3,190,131 | 6/1965 | Daubert | 250—203 |
| 3,200,510 | 8/1965 | Hunter | 74—5.6 X |
| 3,225,608 | 12/1965 | Simon | 74—5.6 |
| 3,226,982 | 1/1966 | Betts | 74—5.6 |
| 3,254,537 | 6/1966 | Elwell et al. | 74—5.6 |
| 3,268,735 | 8/1966 | Beeh | 250—203 |

RALPH G. NILSON, *Primary Examiner.*

M. A. LEAVITT, E. STRICKLAND,

*Assistant Examiners.*